Dec. 29, 1964     H. R. COOK     3,162,990
SAFETY-TYPE, ROTARY VEGETATION CUTTING BLADE
Filed Aug. 1, 1963     2 Sheets-Sheet 1
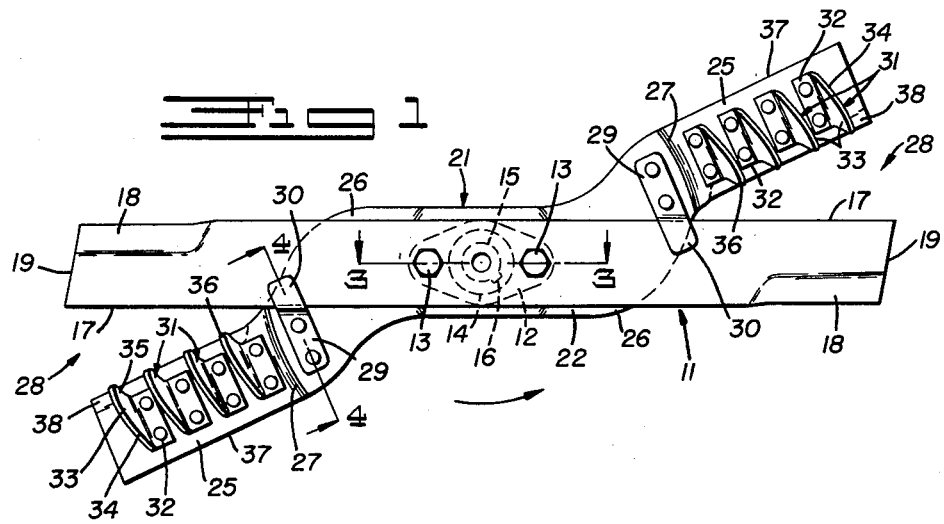
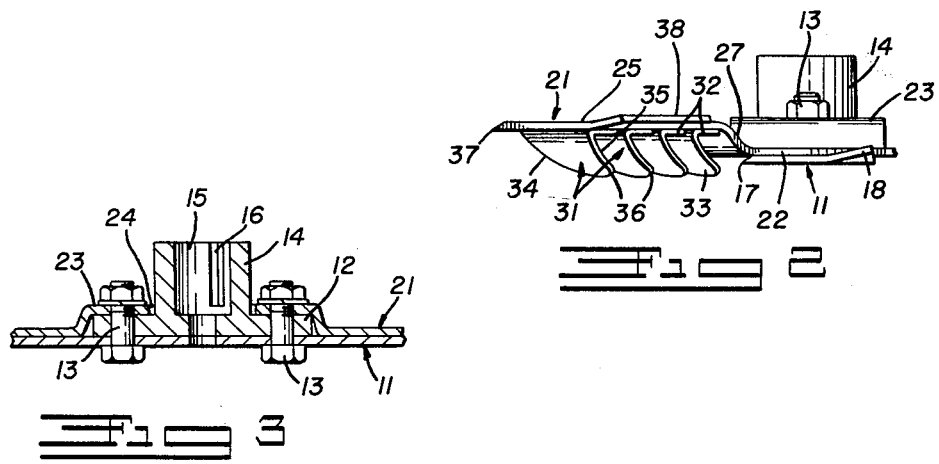
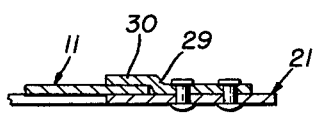
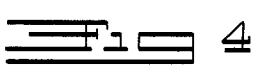
INVENTOR.
HARRY R. COOK
BY
MAHONEY, MILLER & RAMBO
BY
ATTORNEYS

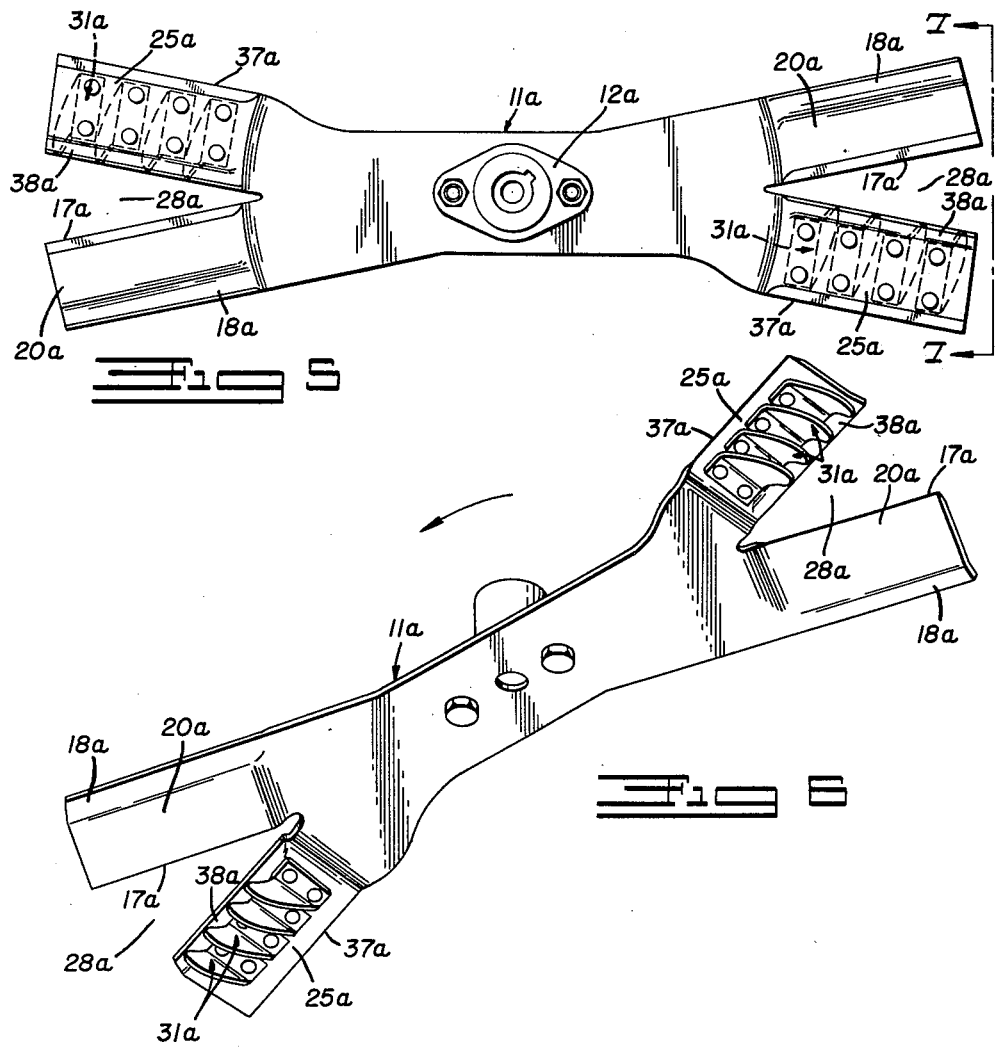

United States Patent Office 3,162,990
Patented Dec. 29, 1964

3,162,990
SAFETY-TYPE, ROTARY VEGETATION
CUTTING BLADE
Harry R. Cook, 2231 Inchcliff Road, Columbus, Ohio
Filed Aug. 1, 1963, Ser. No. 299,388
5 Claims. (Cl. 56—295)

My invention relates to a safety-type, rotary vegetation cutting blade. It relates, more specifically, to an improved safety-type rotary cutting blade for power-driven, rotary-type lawn mowers or similar machines.

This application is a continuation-in-part of my copending application Serial No. 197,528, filed May 24, 1962, now Patent No. 3,103,094.

In said copending application, I disclose a rotary cutting blade for power lawn mowers and similar power-driven vegetation cutting apparatus which is so designed and constructed as to minimize, if not totally eliminate, the dangers attendant to the usual type of high speed, rotary vegetation cutting blades. This blade, while being capable of efficiently cutting blades of grass and other relatively small size vegetation, will not amputate or severely lacerate the hand, fingers or foot of a person coming in contact with the blade during usual operation thereof, and which will not pick up and project rocks or stones or other relatively large size objects outwardly through the discharge chute of the associated lawn mower casing at dangerous velocities.

Specifically, the blade disclosed in said application included a generally flat main body portion adapted to be driven in a high speed rotation about a central vertical axis and having one or more generally radially disposed grass-cutting edges formed or otherwise carried in inwardly recessed or spaced relationship to the extreme outer periphery of the blade so as to sever blades of grass or other relatively small size vegetation coming in contact with the cutting edges from underneath the blade, and was further provided with one or more guard fingers or relatively smooth projections arranged in rotational advance of the cutting edge or edges of the blade so as to forcibly deflect relatively large size objects, such as a foot, finger or larger sizes of stones, out of the path or plane of rotation of the cutting edge or edges of the blade.

The present invention provides a safety-type rotary cutting blade which in its general structure is like that disclosed in said application and, therefore, has the same general advantages of that blade. However, the blade of this present invention has a number of improvements which bring about additional advantages both in manufacture and use. The blade of this present invention can be made by simple tooling and of lesser material and, therefore, at much less cost. In its preferred form, it can be made as an attachment for the standard-type rotary mower blade now in use, and this two-part construction permits replacement of one or the other parts if necessary. In use, the blade is lighter in weight so that there is less fly-wheel effect, thereby making the driving engine easier to start because of less inertia to overcome. Because of its particular structure, it can be balanced more easily and is less subject to vibration because of being out of plane.

Other improvements in the structure of the blade which bring about improvements in its operation will be understood from the drawings and the following description.

In the accompanying drawings, I have illustrated embodiments of this present invention and in these drawings:

FIGURE 1 is at a bottom plan view of a two-part blade assembly embodying the present invention.

FIGURE 2 is an end view of the blade assembly of FIGURE 1.

FIGURE 3 is a vertical sectional view taken through the hub of the blade assembly along line 3—3 of FIGURE 1.

FIGURE 4 is a fragmentary vertical transverse sectional view taken along line 4—4 of FIGURE 1.

FIGURE 5 is a top plan view of a one-piece blade construction embodying the present invention.

FIGURE 6 is a perspective view showing the lower side of the blade of FIGURE 5.

FIGURE 7 is an end view of the blade taken from the position indicated at line 7—7 of FIGURE 5.

With reference to the drawings, in FIGURES 1 to 4, inclusive, I have illustrated the preferred embodiment of my invention in which it takes the form of a safety guard attachment for the standard type of rotary cutting blade of a power-driven rotary-type lawn mower.

The standard cutting blade is indicated generally by the numeral 11. It is provided on its upper surface midway of its ends with the usual adapter 12 by means of which it may be mounted in the usual manner on the power driven shaft of a rotary-type lawn mower in the usual housing or casing. The adapter 12 has a flange resting on the blade 11 and is held in position thereon by means of clamping bolts 13. The adapter 12 is provided with an upstanding hub 14 which is provided with an upwardly opening socket 15 for receiving the lower end of the mower drive shaft, the wall of the socket being provided with a keyway slot 16.

The blade 11 is formed in the usual manner of flat bar stock and is provided adjacent its outer ends on its leading edges with the opposed cutting edges 17. Directly following each of these cutting edges 17 is a turned-up lip 18 which is formed on the trailing edge of the blade. This lip serves to propel air upwardly and lift the grass cuttings produced by the preceding cutting edge 17. Also, the lip serves as a stiffening rib for the blade. It will be noted that the blade 11 is a straight blade with its center line passing through the axis of the hub 14 and with its ends 19 angled inwardly slightly relative to its direction of rotation.

The attachment of this present invention is in the form of a safety guard blade 21 which in the blade assembly cooperates with the blade 11 to prevent severe lacerations of the hand, fingers, or foot of a person coming in contact with the blade assembly during usual operation thereof, and will prevent the assembly from picking up and projecting rocks or stones or other relatively large size objects outwardly through the discharge chute of the associated lawn mower casing at dangerous velocities.

The blade 21 is also formed from flat bar stock and is provided with a straight intermediate mounting section 22 which is adapted to overlay the blade 11 and be coextensive therewith at its intermediate section. This intermediate section 22 is upset midway of its ends to provide a boss 23 which fits over the flanged portion of the adapter 12 and which has a central opening 24 upwardly through which the hub 14 extends. The bolts 13 extend upwardly through suitable openings in the boss 23 and cooperate therewith to clamp the blade 21 firmly in a fixed position to the blade 11. In this manner, the blade 21 is assembled with the blade 11 without disturbing the standard level of the blade 11 when it is mounted on the drive shaft of the mower, since the usual position of the hub 14 relative to the blade 11 is not disturbed.

At each outer end of the blade 21, I provide a straight guard section 25. Each guard section 25 is connected to the associated end of the intermediate section 22 by means of a curved connecting portion 26. Where each portion 26 joins with the associated end section 25, there is provided a step 27 so that the end section is at a higher level than the intermediate section 22.

It will be noted that with this arrangement, the end sections 25 of the blade 21 are offset relative to the intermediate section 22, the center lines of the end sections 25 being offset relative to each other and to the center line of the intermediate section 22 and being at an angle thereto. Consequently, the end sections 25 are disposed in diverging relationship to the adjacent outer ends of the blade 11, providing an outwardly diverging or V-shaped space or slot 28 therebetween. Furthermore, it will be noted that the end sections 25 of the blade 21 are at a higher level than the associated end portions of the blade 11. To aid the clamping arrangement, including the bolts 13, in holding the blades 11 and 21 in this angular relationship, clips 29 are provided, and are riveted to the lower surface of the blade 21 adjacent the steps 27 thereof. Each clip has a downwardly offset free end 30 which extends over the adjacent edge of the blade 11 to clamp the outer end portions of the two blades together.

It will be apparent that in operation the blade assembly is rotated about an axis corresponding to that of the hub 14, and in a direction such that each of the end sections 25 of the blade assembly will be in leading relationship to the associated cutting edge 17 on the blade 11. To guard against contact of foreign objects with each cutting edge 17, the lower surface of each section 25 is provided with a plurality of relatively spaced apart guard fingers 31. Each of these fingers is of substantially L-shape in cross-section and has its upper flange 32 riveted to the lower surface of the blade section 25. Each guard finger is provided with a depending outer flange 33 which is directed outwardly at a slight angle and which may be rounded at its extreme lower edge 34. It will be apparent from FIGURE 2 that the flange 33 is shaped to obtain maximum downward projection with a minimum of area. For this reason, its lower edge 34 is curved downwardly and rearwardly from substantially merging relationship with the blade section 25 to a more blunt trailing edge 35. The trailing edge 35 of each flange 33 is curved concavely forwardly but forms at its junction with the lower edge 34 a blunt trailing extremity 36. It will be noted in FIGURE 1 that the fingers 31 are disposed in alignment along the blade section 25 and that the outwardly angled outer flanges 33 thereof are disposed in longitudinally spaced relationship. Furthermore, as seen in FIGURE 2, the guard section 25 is at a level higher than the following cutting edge 17 of the blade 11, and the guard flanges 33 will therefore be of sufficient depth to extend, at their trailing ends, below the plane of the cutting edge. The result is that the depending flanges of the guard fingers are in rotational advance of and project downwardly below the plane of rotation of the cutting edges 17.

The forward or leading edge of each blade section 25 is formed as a cutting edge 37 and it will be noted that this cutting edge is at a higher level than the cutting edge 17 on the associated end of the blade 11. The trailing edge of each blade section 25 is turned upwardly to provide a lip 38 which diverts the air upwardly during rotation of the blade assembly and also acts as a reinforcing rib.

In the operation of this blade assembly, it will be driven in a clockwise direction as viewed from the top, or in a counterclockwise direction as viewed in FIGURE 1. Therefore, each guard blade section 25 will be directly ahead of the cutting edge 17 on the associated end of the blade 11. The blade at normal cutting speeds is driven, for example, at 3200 to 3600 r.p.m., and even at idling speeds is driven at a high speed of about 600 r.p.m. As the mower advances over the grass, the diverging ends of the associated blades 11 and 21 will make it possible for the blades of grass to lift upwardly into the V-slot 28 provided therebetween into association with the cutting edge 17. Of course, the blades of grass will also lift up into the plane of the blades as each blade passes. The two groups of guard fingers 31 being mounted in rotational advance of the associated cutting edges 17 and projecting downwardly below the plane of rotation of the cutting edges function, during rotation of the blade assembly, as a comb for the comparatively flexible blades of grass engaged by the guard blade sections 25, thus permitting the relatively narrow, flexible blades of grass to pass therebetween and into the path of rotation of the cutting edges 17. The cutting edges 37 will cut the grass at a higher level before the trailing edge 17 cuts it, but due to the high speed of the blade assembly, the group of guard fingers 31, on the opposite end of the blade and which precede it in rotation, will serve as a safety guard for this cutting edge because of the high speed of rotation of the blade assembly even when idling. Thus, the preceding group of guard fingers 31 on one end of the blade assembly will deflect any large size solid objects, such as stones, fingers or feet downwardly out of the path of the trailing cutting edges 37 on the opposite end of the blade assembly. Also, the groups of guard fingers 31 just ahead of the cutting edges 17 will serve to deflect any large size solid objects downwardly out of the V-shaped slots 28 at the opposite ends of the blade assembly. The upturned lips 38 and 18 which trail the respective cutting edges 37 and 17 will have a fan blade effect lifting the clippings upwardly away from the blade assembly. The outer end of the guard blade section 25 will be sufficiently close to the peripheral wall of the mower housing that it will be practically impossible to insert an object radially into the V-shaped slot 28 ahead of the end of the cutting edge 17, even though the edge 17 does project outwardly slightly beyond the associated outer leading corner of the section 25 of the blade 21. It will be noted that the cutting edges 17 are ahead of the center line of the blade 11, and therefore, grass clippings which might otherwise tend to cling to and build-up upon the cutting edges 17 will slide off the outer ends of the cutting edges 17. This is also true of the cutting edges 37 which are ahead of radial lines corresponding to the center line of the blade 21. Furthermore, as previously indicated, these cutting edges 17 and 37 are behind the respective upturned edges 18 and 38 which lift the grass clippings, and it will be noted that these latter edges are ahead of such radial lines. The slight outward inclination of the flanges 33 of the guard fingers 31 will allow the clippings to slip off these flanges under the influence of centrifugal force.

With this type of blade assembly, either the blade 11 or the blade 21 can be replaced if necessary. Usually, the cutting blade 11 needs replacement more often because of wear on the cutting edges 17.

In FIGURES 5 to 7, inclusive, I have illustrated another form of my invention. In this form, the blade is made as a one-piece unit. However, it functions in substantially the same manner as the blade assembly described with reference to FIGURES 1 to 4, inclusive.

It will be noted that the one-piece blade unit 11a is provided with the usual adapter hub 12a for mounting it on the drive shaft of a mower. Each end of the blade unit in this instance is provided with the cutting section 20a which has formed on its leading edge the cutting edge 17a and on its trailing edge the upturned lip 18a. Also on each end of the blade unit, there is provided the guard section 25a which is provided with the leading cutting edge 37a and the trailing upturned lip 38a. Between the diverging portions 20a and 25a, the V-shaped slot 28a is formed. The guard fingers 31a are mounted on the end sections 25a of the blade in exactly the same manner as before. The guard fingers 31a are identical in construction and operation to the fingers 31 previously described.

It will be apparent that the blade unit in this form will have the same overall general arrangement as the blade assembly of FIGURES 1 to 4, inclusive. It will therefore function in substantially the same manner. A detailed description of the operation of this unit is, therefore, not deemed necessary.

It will be apparent from the above description that my present invention provides a blade unit which has the same general advantages as the blade of my copending application, but which has additional advantages due to the structural improvements incorporated therein. The blade of the present invention can be made by simple tooling from a minimum amount of material. It is lighter in weight and has a reduced fly-wheel effect which will facilitate starting of a mower carrying it. It can be balanced more easily and will not be subject to excessive vibration because of being out of plane due to the fact that it merely comprises the opposed radially extending arms. In both forms of the present invention, the cutting edges will be adequately protected by means of the guard finger arrangement.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described my invention, what I claim is:

1. A safety-type, rotary, vegetation cutter comprising an elongated, bar-type blade means having a centrally disposed axis of rotation and terminating at each end thereof in a pair of acutely angularly divergent arms defining therebetween an outwardly opening, generally V-shaped slot, at least one of said arms having a leading cutting edge defining one side of said slot and arranged in slightly vertically offset, rotationally trailing relation to the other of said arms, each of said arms being formed with an upturned trailing edge portion; and a plurality of relatively spaced apart guard fingers carried by the other of said arms in rotational advance of the cutting edge of said one arm, said guard fingers extending substantially perpendicularly through the plane of rotation of said cutting edge and being operable upon rotation of said blade means to deflect relatively large size objects out of the path of rotation of said cutting edge while permitting relatively smaller size vegetation to enter between said guard fingers into the path of rotation of said cutting edge.

2. A safety-type, rotary, vegetation cutter as defined in claim 1, wherein said blade means is of integral, one-piece construction.

3. A safety-type rotary, vegetation cutter as defined in claim 1, wherein said blade means comprises two separable, elongated bar sections having relatively overlapping central portions detachably secured to one another.

4. A safety-type, rotary, vegetation cutter according to claim 3, wherein the central portion of one of said bar sections is formed with a raised boss having a central opening disposed in concentric relation to the axis of rotation of said blade means; a drive shaft adapter having a tubular hub portion extending through the central opening of said raised boss and a relatively enlarged attaching flange portion sandwiched between said raised boss and the central portion of the other of said bar sections; and clamping bolts extending through said raised boss, said attaching flange portion and the central portion of said other of said bar sections and detachably uniting said bar sections and said adapter for unified rotation.

5. A safety-type, rotary, vegetation cutter according to claim 4, including a plurality of clamping clips carried by one of said bar sections in outwardly spaced relation to the central portion thereof and detachably engaged with the other of said bar sections.

References Cited in the file of this patent

UNITED STATES PATENTS

| | | |
|---|---|---|
| 1,211,566 | Fortney | Jan. 9, 1917 |
| 2,908,128 | Mauro | Oct. 13, 1959 |
| 3,103,094 | Cook | Sept. 10, 1963 |